(12) United States Patent
Simpson et al.

(10) Patent No.: US 7,634,553 B2
(45) Date of Patent: Dec. 15, 2009

(54) SERVICE PROXY FOR EMULATING A SERVICE IN A COMPUTER INFRASTRUCTURE FOR TESTING AND DEMONSTRATION

(75) Inventors: Gregory J. Simpson, Parker, CO (US); Gregory M. Jewell, Aurora, CO (US)

(73) Assignee: Raytheon Company, Waltham, MA (US)

( * ) Notice: Subject to any disclaimer, the term of this patent is extended or adjusted under 35 U.S.C. 154(b) by 137 days.

(21) Appl. No.: 11/545,129

(22) Filed: Oct. 9, 2006

(65) Prior Publication Data

US 2008/0086541 A1    Apr. 10, 2008

(51) Int. Cl.
*G06F 15/177* (2006.01)
*G06F 15/16* (2006.01)
*G06F 15/173* (2006.01)
*G06F 9/44* (2006.01)
*G06F 13/12* (2006.01)
*G06F 13/10* (2006.01)
*G06F 9/45* (2006.01)
*G06F 9/46* (2006.01)
*G06F 3/00* (2006.01)
*G06F 13/00* (2006.01)

(52) U.S. Cl. ............. 709/220; 709/205; 709/218; 709/219; 709/223; 709/224; 703/20; 703/21; 703/22; 719/314; 719/318

(58) Field of Classification Search ......... 709/202–207, 709/217–224, 249; 703/20–22; 719/314, 719/318
See application file for complete search history.

(56) References Cited

U.S. PATENT DOCUMENTS

| | | | |
|---|---|---|---|
| 5,946,311 A * | 8/1999 | Alexander et al. | 370/395.53 |
| 6,223,227 B1 | 4/2001 | Williamson et al. | |
| 6,466,992 B2 | 10/2002 | Williamson et al. | |
| 6,502,213 B1 * | 12/2002 | Bowman-Amuah | 714/49 |
| 6,505,241 B2 * | 1/2003 | Pitts | 709/218 |
| 6,587,836 B1 * | 7/2003 | Ahlberg et al. | 705/26 |
| 6,606,708 B1 * | 8/2003 | Devine et al. | 726/8 |
| 6,681,243 B1 * | 1/2004 | Putzolu et al. | 709/202 |
| 6,842,906 B1 * | 1/2005 | Bowman-Amuah | 719/330 |
| 7,020,797 B2 * | 3/2006 | Patil | 714/4 |
| 7,107,347 B1 * | 9/2006 | Cohen | 709/229 |
| 7,130,891 B2 * | 10/2006 | Bernardin et al. | 709/218 |
| 7,225,249 B1 * | 5/2007 | Barry et al. | 709/227 |
| 7,363,374 B2 * | 4/2008 | Paul et al. | 709/226 |
| 7,428,723 B2 * | 9/2008 | Greene et al. | 717/103 |
| 7,457,865 B2 * | 11/2008 | Ramakrishnan et al. | 709/224 |

(Continued)

OTHER PUBLICATIONS

ISR and Written Opinion dated Jul. 25, 2008, PCT Application No. PCT/US07/80841.

*Primary Examiner*—Vivek Srivastava
*Assistant Examiner*—Melvin H Pollack
(74) *Attorney, Agent, or Firm*—Glenn H. Lenzen

(57) ABSTRACT

A method of emulating a service in a computer infrastructure includes the steps of providing a service proxy instance as a stand-in for the service and running the service proxy instance on a computer accessible to the computer infrastructure. The service proxy instance is configured at run time in accordance with a configuration file, wherein the configuration file includes an operating mode specification. The service proxy instance communicates with at least one destination in adherence to the operating mode specification and a communication protocol.

23 Claims, 7 Drawing Sheets

U.S. PATENT DOCUMENTS

| | | | |
|---|---|---|---|
| 7,467,389 B2 * | 12/2008 | Mukkamala et al. | 719/316 |
| 7,483,438 B2 * | 1/2009 | Serghi et al. | 370/401 |
| 7,487,509 B2 * | 2/2009 | Hugly et al. | 719/310 |
| 7,487,512 B2 * | 2/2009 | Brunswig et al. | 719/318 |
| 7,516,227 B2 * | 4/2009 | Cohen | 709/228 |
| 7,552,205 B2 * | 6/2009 | Lamb et al. | 709/223 |
| 7,559,065 B1 * | 7/2009 | Sosnovsky et al. | 719/318 |
| 2001/0014881 A1 * | 8/2001 | Drummond et al. | 705/43 |
| 2003/0074413 A1 * | 4/2003 | Nielsen et al. | 709/206 |
| 2003/0093479 A1 * | 5/2003 | Mellen-Garnett et al. | 709/205 |
| 2004/0186891 A1 * | 9/2004 | Panec et al. | 709/206 |
| 2004/0205205 A1 * | 10/2004 | Patterson | 709/229 |
| 2005/0010661 A1 * | 1/2005 | Southam et al. | 709/224 |
| 2005/0021689 A1 * | 1/2005 | Marvin et al. | 709/220 |
| 2005/0246153 A1 | 11/2005 | Genkin et al. | |
| 2006/0015584 A1 * | 1/2006 | Ocko et al. | 709/219 |
| 2006/0047496 A1 | 3/2006 | Genkin et al. | |
| 2006/0074618 A1 * | 4/2006 | Miller et al. | 703/13 |
| 2006/0123474 A1 * | 6/2006 | Hagg et al. | 726/12 |
| 2006/0136555 A1 * | 6/2006 | Patrick et al. | 709/203 |
| 2007/0201655 A1 * | 8/2007 | Shenfield | 379/201.01 |
| 2007/0239420 A1 * | 10/2007 | Papaefstathiou et al. | 703/14 |

* cited by examiner

SERVICE PROXY FOR EMULATING A SERVICE IN A COMPUTER INFRASTRUCTURE FOR TESTING AND DEMONSTRATION

FIELD

This invention relates generally to the field of programming computers, and more specifically to a method of emulating a service in a computer infrastructure.

BACKGROUND

A collection of one or more computers and their associated software is commonly called a computer infrastructure. Each computer in the computer infrastructure is generally operable to communicate with each other computer in the infrastructure. Computer infrastructures having a service oriented architecture ("SOA") are increasingly being developed. A computer infrastructure having a SOA has core functions that are partitioned into a plurality of loosely coupled functional core services. Such functional core services, which are hereinafter referred to as services, are representations of one or more functions performed by the SOA computer infrastructure. For example, one service in a SOA computer infrastructure may perform a printing function, while another service may perform a file storage function.

A service may be executed on one or more computer of a SOA computer infrastructure in accordance with computer readable instructions embodied in software or firmware. For example, a service may be embodied in Java computer code and executed on a single computer of a SOA computer infrastructure. As another example, a service may be embodied in C++ computer code that is executed in a distributed manner on three computers of a SOA computer infrastructure.

A SOA computer infrastructure generally includes a message-oriented middleware ("MOM") application that implements messaging services within the infrastructure. The messaging services allow elements of the SOA computer infrastructure, such as services, to exchange information by exchanging messages between destinations. An example of a MOM application is a Java Messaging Service ("JMS").

A message may include information such as data, requests, commands, and/or instructions. A message may also include message identification and routing information, commonly collectively referred to as a header. For example, a header may include a "reply-to" field that specifies where a response to the message should be delivered.

As stated above, messages are generally exchanged between destinations. A destination is a logical point or construct that serves as a relay point during a message exchange; the destination provides a logical place for two or more elements (e.g. services) of a SOA infrastructure to exchange a message. A service may publish a message to a destination or monitor the destination for receipt of a message. For example, a first service may publish a message to the destination, and a second service may monitor the destination in order to receive the message. A given service may be operable to communicate with a plurality of destinations at a give time.

An example of SOA computer infrastructure is a order processing system that allows a user to purchase an airline ticket. The order processing system includes a plurality of computers, some of which are located in different physical locations, and a plurality of services, which perform specific functions required by the order processing system. For example, the order processing system may include a query service, which is used to query an airline's database for available flights, and a purchasing service, which is used to purchase a ticket from the airline. As additional examples, the order processing system may include a financial transaction processing service, which may be used to process a user's credit card, and an itinerary service, which may be used to generate a user's flight itinerary. Each service may be executed on one or a plurality of the order processing system computers.

SOA computer infrastructures are typically developed incrementally—the framework of the infrastructure is typically developed before the services. Individual services are then added to the framework as they become available. Even if a service is available, it may not be completely functional due to it being incomplete and/or defective.

It is problematic that SOA computer infrastructures frequently cannot be fully tested during their development due to one or more services being unavailable or not fully functional. Consequently, the service's interaction with the infrastructure and/or other services may not be tested. Unavailability or lack of functionality of a service may therefore result in increased development time, development costs, and/or development complexity of a SOA computer infrastructure. Furthermore, a service's unavailability or lack of functionality may impede demonstration of the SOA computer infrastructure to an interested party. For example, a lack of one or more services may prevent a demonstration of a SOA computer infrastructure to a prospective purchaser of the infrastructure.

Accordingly, what is needed is a service proxy that can be used to emulate one or more missing and/or not fully functional services in a computer infrastructure during its development.

BRIEF SUMMARY

The service proxy and applications thereof herein disclosed advance the art and may overcome at least one of the problems articulated above by providing a service proxy that may be used to emulate a service in a computer infrastructure.

In particular, and by way of example only, a method of emulating a service in a computer infrastructure includes the steps of providing a service proxy instance as a stand-in for the service and running the service proxy instance on a computer accessible to the computer infrastructure. The service proxy instance is configured at run time in accordance with a configuration file, wherein the configuration file includes an operating mode specification. The service proxy instance communicates with at least one destination in adherence to the operating mode specification and a communication protocol.

According to another embodiment, a computer system for emulating a service includes a processing unit, a memory storage device coupled to the processing unit, an input device coupled to the processing unit, and an output device coupled to the processing unit. The processing unit is operative to run a service proxy instance and configure the service proxy instance at run time in accordance with a configuration file, wherein the configuration file includes an operating mode specification. Additionally, the processing unit is operative to enable the service proxy instance to communicate with at least one destination in adherence to the operating mode specification and a communication protocol.

In yet another embodiment, a software product includes instructions, stored on computer-readable media, wherein the instructions, when executed by a computer, perform the steps of emulating a service in a computer infrastructure. The instructions perform the steps of running a service proxy instance and configuring the service proxy instance at run time in accordance with a configuration file, wherein the configuration file includes an operating mode specification. The instructions also perform the step of communicating between the service proxy instance and at least one destination in adherence to the operating mode specification and a communication protocol.

DETAILED DESCRIPTION OF THE INVENTION

The present teaching is by way of example only, not by way of limitation. The concepts herein are not limited to use or application with a specific type service proxy. Thus, although the instrumentalities described herein are for the convenience of explanation, shown and described with respect to exemplary embodiments, it will be appreciated that the principles herein may be applied equally in other types of service proxies. To avoid unnecessary repetition in the discussion, the respective figures of the drawings retain like numbering of identical features.

Figure 1:
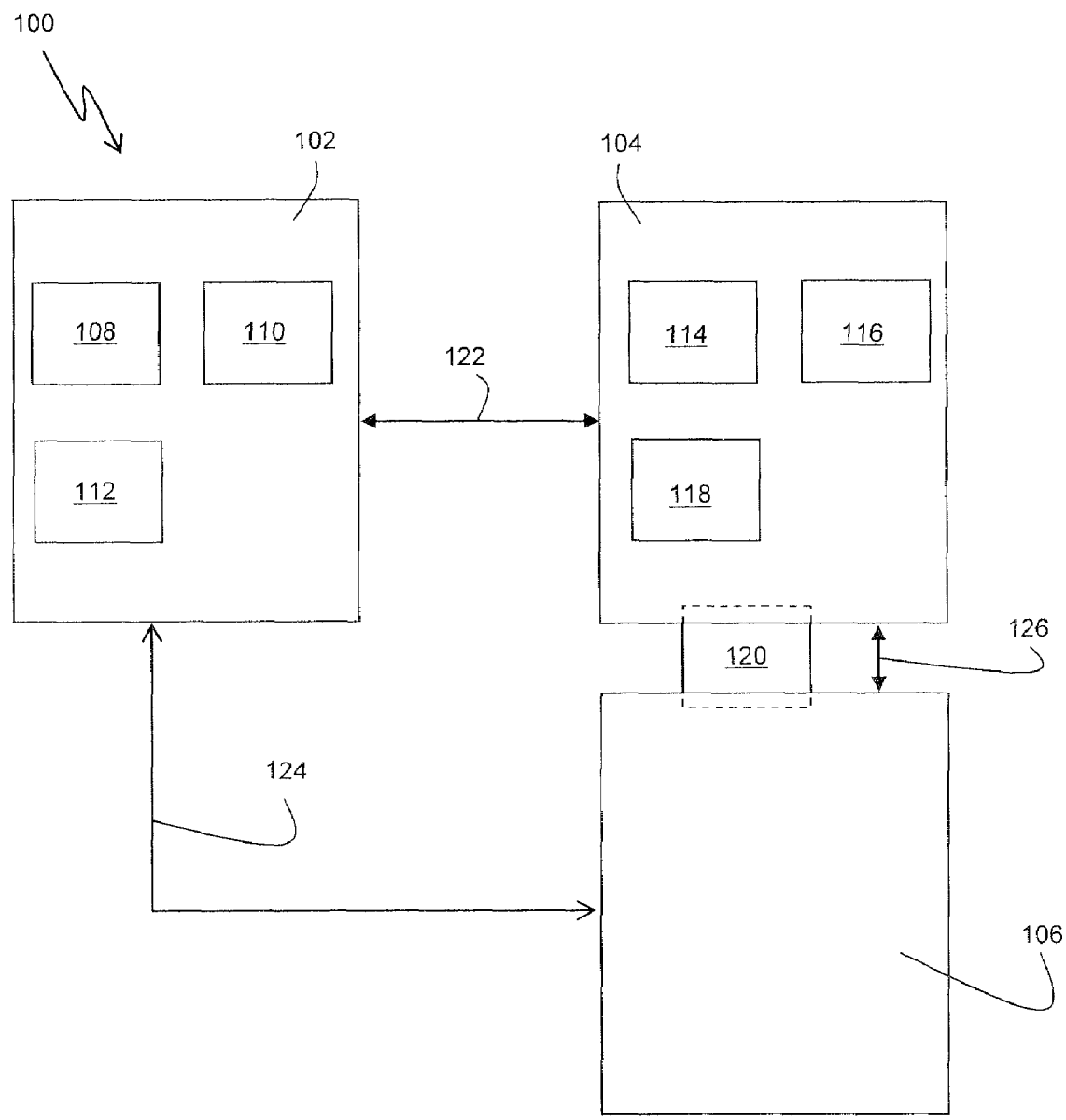
FIG. 1 is block diagram of a SOA computer infrastructure having a plurality of services, according to an embodiment.

FIG. 1 is block diagram of SOA computer infrastructure 100 having computers 102, 104, and 106. Computers 102 and 104 are connected via communications network 122; computers 102 and 106 are connected via communications network 124; and computers 104 and 106 are connected via communications network 126. Although SOA computer infrastructure 100 is illustrated as having three computers, other embodiments of SOA computer infrastructure 100 may have a different quantity of computers.

Computers 102, 104, and 106 may be any general purpose or specialty computers. For example, computers 102, 104, and/or 106 may be personal computers or servers. Furthermore, computers 102, 104, and/or 106 may each represent a cluster of a plurality of computers.

Communication links 122, 124, and 126 may be any suitable communication links to enable computers 102, 104, and 106 to communicate with each other. For example, communication links 122, 124, and/or 126 may be wired, optical, or wireless Ethernet links.

Computers 102, 104, and/or 106 may each individually host one or more services; computers 102, 104, and/or 106 may each also jointly host one or more services with one or more computers. For example, computer 102 is illustrated as individually hosting services 108, 110, and 112. Computer 104 is illustrated as individually hosting services 114, 116, and 118. Computers 104 and 106 jointly host service 120. As stated above, a service represents one or more functions performed by the computer infrastructure. Although SOA computer infrastructure 100 is illustrated as having a total of seven services distributed among three computers, other embodiments of SOA computer infrastructure 100 may have other quantities of services, and each computer may host any quantity of services.

In an embodiment of SOA computer infrastructure 100, the services may communicate using a MOM application. For example, the services may communicate using a protocol that adheres to a Java Messaging Service ("JMS") specification.

As discussed above, the framework of a SOA computer network is often developed before one or more of the services. For example, computers 102, 104, and 106 as well as communication links 122, 124, and 126 may be developed and/or integrated together before any services in SOA computer infrastructure 100 are available. In order to facilitate testing and/or demonstration of SOA computer infrastructure 100, or any other SOA computer infrastructure, one or more services of the infrastructure may be emulated using service proxy 200. Service proxy 200 may be used to emulate a missing, defective, or incomplete service.

Figure 2:
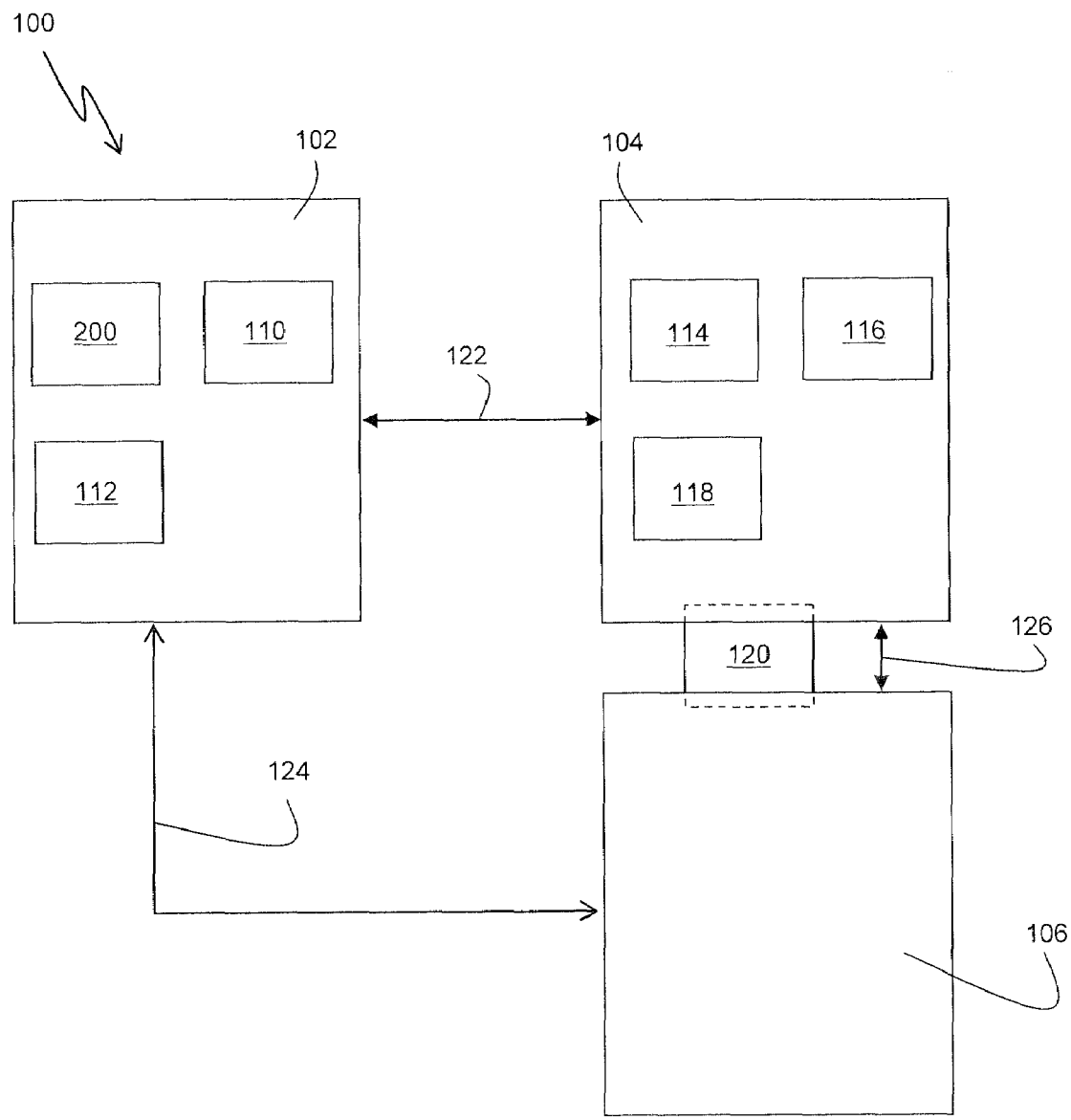
FIG. 2 is block diagram of a SOA computer infrastructure having a service proxy, according to an embodiment.

As an example, FIG. 2 illustrates SOA computer infrastructure 100 having service 108 substituted with service proxy 200; service proxy 200 emulates service 108. Stated in another manner, service proxy 200 operates as a stand-in for service 108. Service 108 may be missing, defective, or incomplete. Although service proxy 200 is illustrated as emulating service 108 in computer 102, service proxy 200 may be used to emulate other services. Furthermore, service proxy 200 may be used in other computers and in other SOA computer infrastructures.

Service proxy 200 is a computer application embodied by computer readable instructions or computer code that can be executed on any of the computers of SOA computer infrastructure 100 to emulate a service. The computer code may be embodied as a software product stored on a computer readable media, such as a magnetic or optical disk. In one aspect, multiple instantiations of the routines of the software product may be executed substantially concurrently. Service proxy 200 may be written in computer programming code adhering to a Java specification, such as Sun Microsystems Java 1.4.2 SDK.

A plurality of service proxies, e.g. service proxy 200, may be executed at a given time. Each service proxy, e.g. service proxy 200, may include a plurality of events, actions or emulations, each individually referred to as an instance of service proxy 200. For example, two instances of service proxy 200 may be used to emulate two respective services of SOA computer infrastructure 100.

Service proxy 200 is operable to communicate with destinations in SOA computer infrastructure 100 by sending and/or receiving messages using a MOM application. For example, service proxy 200 may be operable to exchange messages with destinations using a MOM communication protocol adhering to a JMS specification. By way of example and not of limitation, the JMS specification may include the implementations provided by Sonic Software's SonicMQ, BEA's Weblogic, and/or JBoss.

Service proxy 200 may be executed on a computer other than the computer that the service being emulated is expected to executed on. Service proxy 200 may be executed on any computer accessible to SOA computer infrastructure 100.

Service proxy 200 is operable according to a plurality of operating modes, including an audit operating mode, an injector operating mode, a pub-sub operating mode, an interceptor mode, and a routing mode, each of which are discussed in more detail below. Service proxy 200 is configured at run time using a configuration file. The configuration file instructs service proxy 200 how it is to operate and communicate with destinations, and the configuration file includes an operating mode specification. In an embodiment, the configuration file is embodied by an extensible markup language file.

In an embodiment of service proxy 200, each of a plurality of instances of service proxy 200 are configured via a respective configuration file. In other embodiments, each of a plurality of instances of service proxy 200 are configured via one common configuration file.

Figure 3:
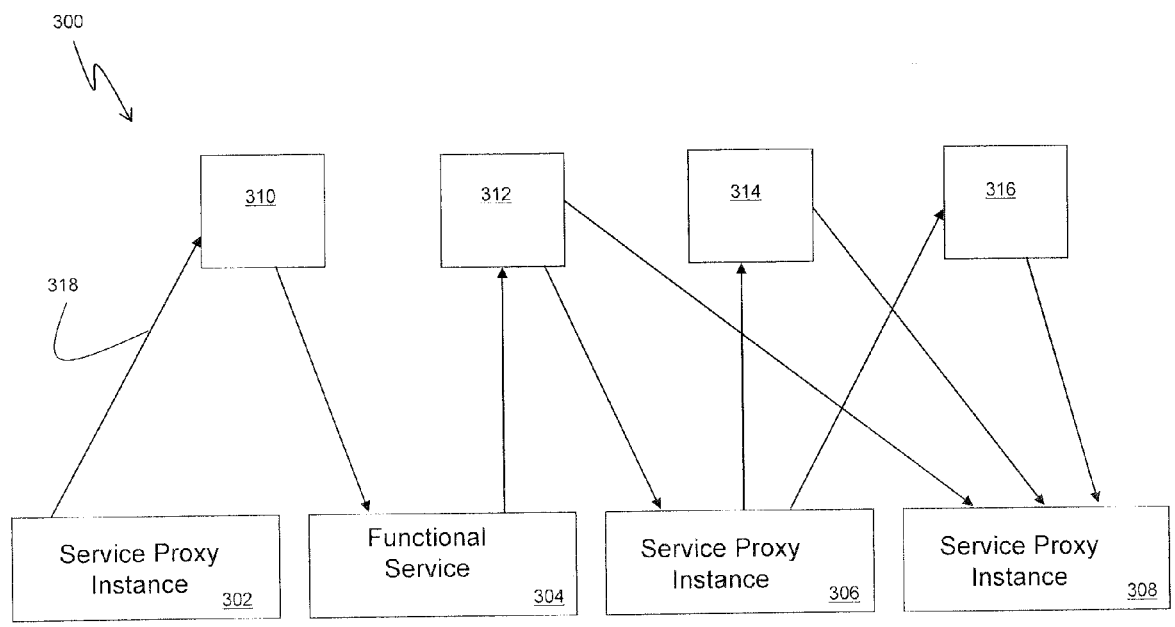
FIG. 3 is a block diagram illustrating a subset of a SOA computer infrastructure including a plurality of service proxy instances, according to an embodiment.

One service proxy 200 instance may operate along side other service proxy 200 instances, as may be noted by studying FIG. 3, which is a clock diagram illustrating subset 300 of a SOA computer infrastructure including a plurality of service proxy 200 instances. Subset 300 is illustrated as including service proxy instances 302, 306, and 308, each of which are emulating a service. Subset 300 also includes service 304, which is a fully functional service, and destinations 310, 312, 314, 316. Although subset 300 is illustrated as having three instances (302, 306 and 308) of service proxy 200, one instance of a fully functional service (304), and four destinations 310, 312, 314, 316), subset 300 can have any quantity of each of these elements.

Communication between a service proxy 200 instance and a destination is denoted by an arrow in FIG. 3. The direction of the arrow indicates the direction of travel of a message between the service proxy instance and the destination. For example, FIG. 3 illustrates arrow 318 pointing from service proxy instance 302 to destination 310; arrow 318 denotes a message being sent from service proxy instance 302 to destination 310.

As implied by FIG. 3, an instance of service proxy 200 can coexist with one or more other instances of service proxy 200 in a common SOA computer infrastructure. As is also implied by FIG. 3, one or more instances of service proxy 200 can coexist with one or more fully functional services in a common SOA computer infrastructure. Each instance of service proxy 200 in a common SOA computer infrastructure may be configured to operate in a different operating mode. For example, service proxy instance 302 may be configured to operate in the injector mode, service proxy instance 306 may be configured to operate in the pub-sub mode, and service proxy instance 308 may be configured to operate in the routing mode.

Service proxy 200 may be multi-threaded, which may enable it to simultaneously communicate with a plurality of destinations. For example, service proxy instance 306 is illustrated in FIG. 3 as simultaneously communicating with destinations 312, 314, and 316, and service proxy instance 308 is illustrated as simultaneously communicating with destinations 312, 314, and 316. Furthermore, a given destination may communicate with a plurality of service proxy 200 instances. For example, destination 312 is illustrated as communicating with service proxy instances 306 and 308 as well as service 304.

Service proxy 200 may be configured such that it will continue to operate until it is manually interrupted or until it receives a kill message. A kill message may be sent to one or more service proxy 200 instances instructing each instance to terminate. For example, a kill message may be sent to all service proxy 200 instances in a SOA computer infrastructure instructing each instance to terminate. The injector operating mode, which is discussed in below, may be used to send a kill message.

Figure 4:
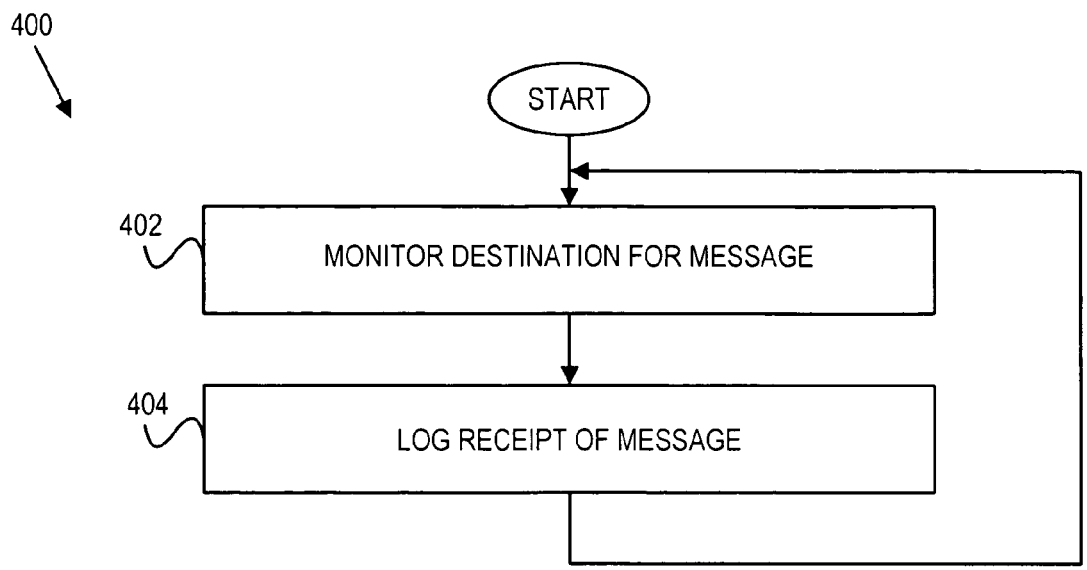
FIG. 4 is a flowchart of a method for operating a service proxy in an audit mode, according to an embodiment.

As discussed above, service proxy 200 can be operated in the audit mode, an example of which is embodied by method 400 of FIG. 4. Method 400 begins with step 402, wherein service proxy 200 monitors at least one destination for receipt of a message. A message received by a destination will hereinafter be referred to as a received message. Upon the destination's receipt of a received message, service proxy 200 logs such receipt in a suitable manner in step 404. For example, the receipt may be logged in a database housed in SOA computer infrastructure 100; alternately, the receipt may be logged in a database external to SOA computer infrastructure 100. Method 400 proceeds from step 404 back to step 402; consequently, method 400 continues to operate until it is manually interrupted or until it detects a kill message on the first destination.

Service proxy 200 can also be operated in the injector mode, as specified above. In the injector mode, service proxy 200 publishes at least one predetermined message to at least one destination. In an embodiment, the predetermined message may be housed in a message file, which may be identified in the configuration file. In some embodiments, a common message file houses a plurality of predetermined messages; in other embodiments, each of a plurality of predetermined messages is housed in a respective message file.

An example of a use of the injector mode is to send a kill message to one or more service proxy 200 instances. As discussed above, a service proxy 200 instance will terminate upon receipt of a kill message by a destination that it is monitoring.

Figure 5:
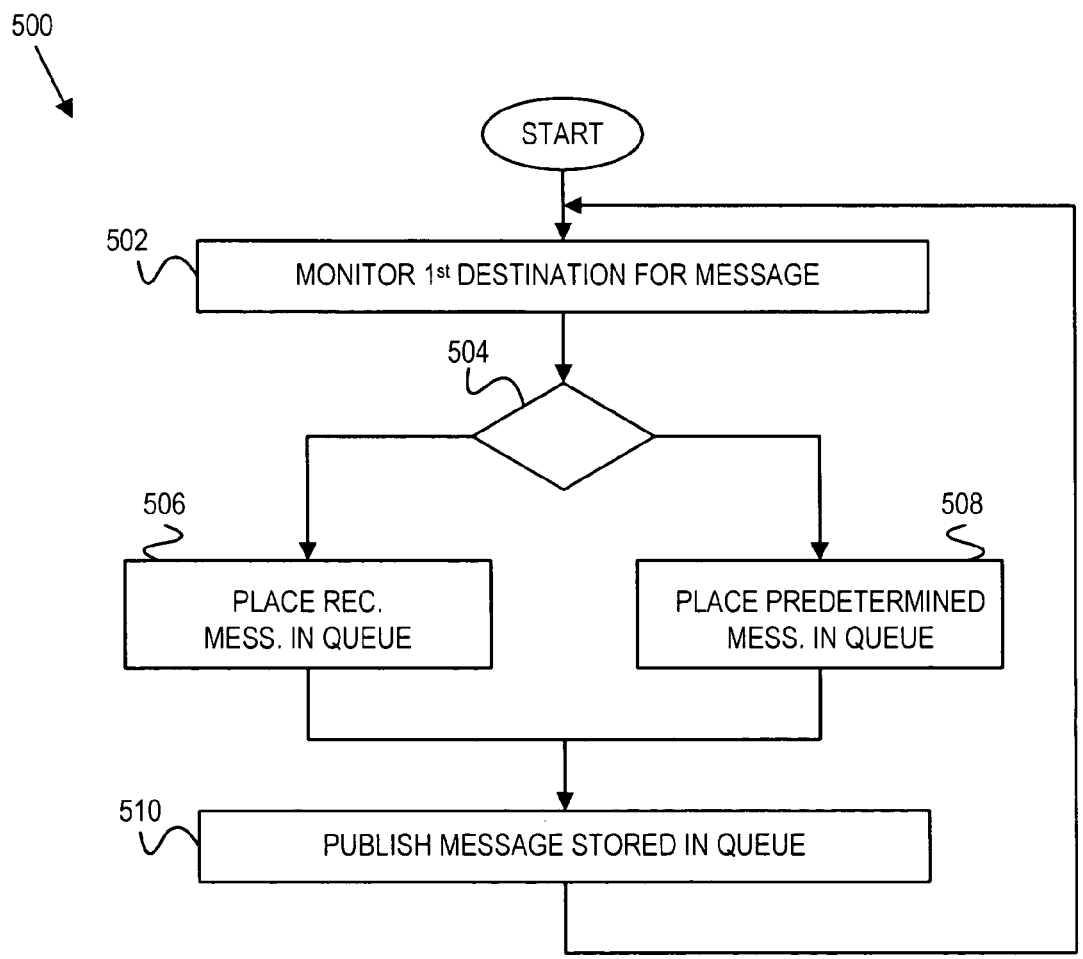
FIG. 5 is a flowchart of a method for operating a service proxy in a pub-sub mode, according to an embodiment.

Service proxy 200 can be further operated in the pub-sub mode, as discussed above. An example of the pub-sub mode is embodied by method 500, which is illustrated in FIG. 5.

Method 500 begins with step 502, wherein service proxy 200 monitors at least one first destination for receipt of a received message. Upon the first destination's receipt of the received message, service proxy 200 determines in step 504 whether it is to publish the received message to at least one second destination, or if alternately, service proxy 200 is to publish a predetermined message to the second destination. In an embodiment, service proxy 200 compares the received message to processing information housed in the configuration file in order to execute decision 504.

If the result of decision 504 is that service proxy 200 should publish the received message, service proxy 200 places the received message in a queue in step 506. The queue may be located internal or external to SOA computer infrastructure 100. If the result of decision 504 is that service proxy 200 should publish the predetermined message, service proxy 200 places the predetermined message in the queue in step 508. In an embodiment of method 500, the predetermined message may be housed in a message file, which may be identified in the configuration file. In some embodiments, a common message file houses a plurality of predetermined messages; in other embodiments, each of a plurality of predetermined message is housed in a respective message file.

Steps 506 and 508 each proceed to step 510, wherein the message placed in the queue is published to at least one second destination. In an embodiment of method 500, service proxy 200 may wait a configurable time delay after executing steps 506 or 508 and before executing step 510. Method 500 proceeds from step 510 back to step 502; consequently, method 500 continues to operate until it is manually interrupted or until it detects a kill message on the first destination.

In an embodiment of method 500, service proxy 200 may publish a message to a destination housed in the "reply-to" field and/or to a predetermined destination included in the configuration file. Stated in another manner, the second destination may be specified by the "reply-to" field of the message or by the configuration file.

Figure 6:
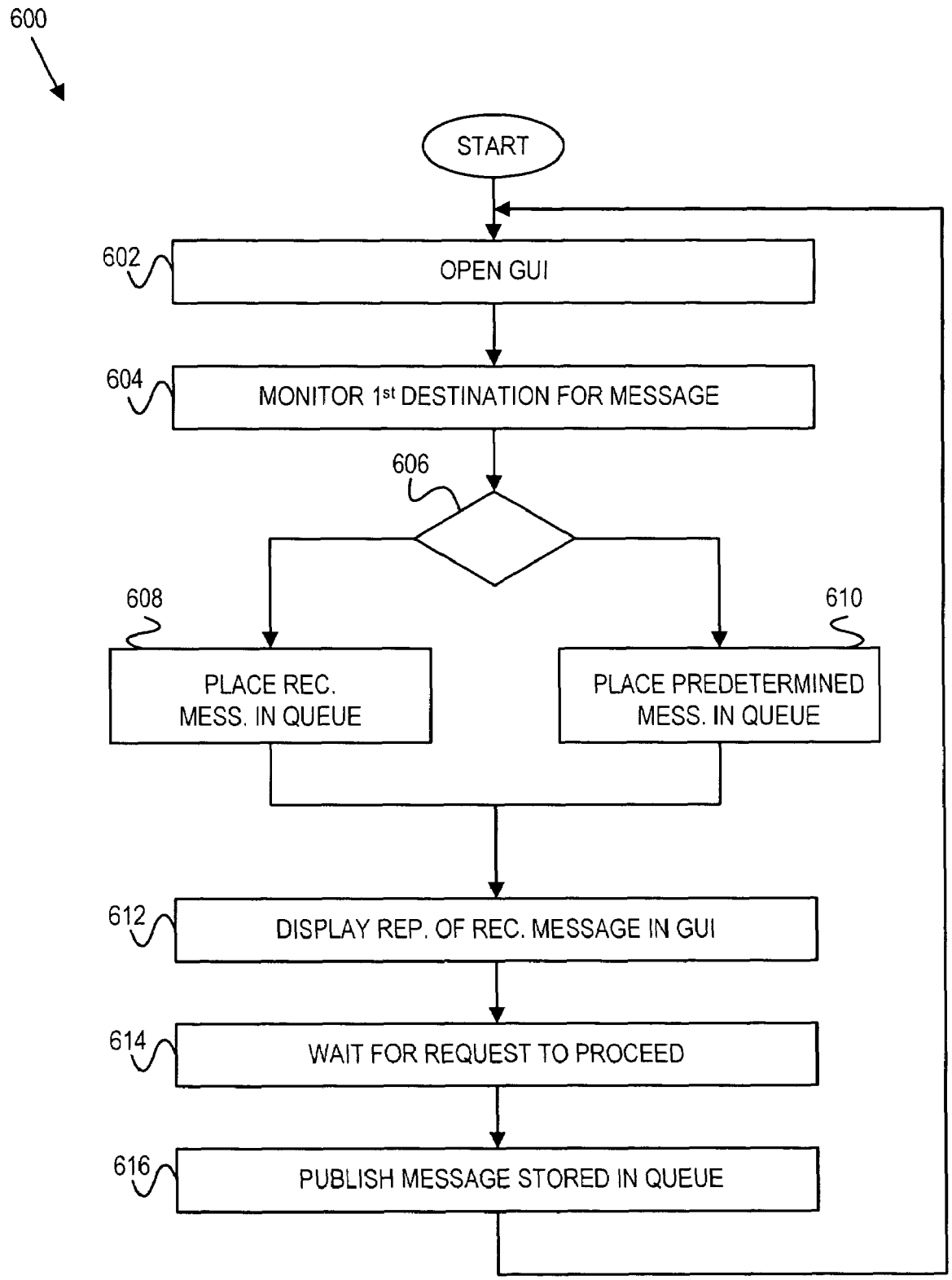
FIG. 6 is a flowchart of a method for operating a service proxy in an interceptor mode, according to an embodiment.

As discussed above, service proxy 200 can be operated in the interceptor mode. The interceptor mode is similar to the pub-sub mode, however, the interceptor mode further includes an additional graphical user interface ("GUI") which may be used to control execution of service proxy 200. The interceptor mode may be embodied by method 600 which is illustrated in FIG. 6.

Method 600 begins with step 602, wherein service proxy 200 opens a GUI indicating that a service proxy 200 instance has been launched. In step 604, service proxy 200 monitors at least one first destination for receipt of a received message. Upon receipt of the received message by the first destination, service proxy 200 determines in step 606 whether it is to publish the received message to at least one second destination, or if alternately, service proxy 200 is to publish a predetermined message to the second destination. In an embodiment, service proxy 200 compares the received message to processing information housed in the configuration file in order to execute decision 606.

If the result of decision 606 is that service proxy 200 should publish the received message, service proxy 200 places the received message in a queue in step 608. The queue may be located internal or external to SOA computer infrastructure 100. If the result of decision 606 is that service proxy 200 should publish the predetermined message, service proxy 200 places the predetermined message in the queue in step 610. In an embodiment, the predetermined message may be housed in a message file, which may be identified in the configuration file. In some embodiments, a common message file houses a plurality of predetermined messages; in other embodiments, each of a plurality of predetermined messages is housed in a respective message file.

Steps 608 and 610 proceed to step 612, wherein a representation of the received message is displayed in the GUI. In step 614, service proxy 200 waits for a request to proceed. Such waiting period may be used to allow a user to pause operation of service proxy 200, which may be useful during debugging and/or demonstrating SQA computer infrastructure 100. A user may provide service proxy 200 a request to proceed via the GUI, such as by selecting an icon on the GUI.

In step 616, the message placed in the queue is published to at least one second destination. Method 600 proceeds from step 616 back to step 602; consequently, method 600 continues to operate until it is manually interrupted or until it detects a kill message on the first destination.

In an embodiment of method 600, service proxy 200 may publish a message to a destination housed in the "reply-to" field and/or to a predetermined destination included in the configuration file. Stated in another manner, the second destination may be specified by the "reply-to" field of the message or by the configuration file.

As discussed above, service proxy 200 may be operated in the routing mode. The routing mode is similar to the pub-sub mode, however, a user may be able to select between at least one primary destination or at least one alternate destination to publish a message to in the routing mode. The primary destination is a default destination that service proxy 200 will publish one or more messages to; the alternate destination is a destination that service proxy 200 will publish one or more messages to as an alternate to the primary destination. The routing mode specification in the configuration file may contain solely one or more primary destinations; alternatively, the configuration file may contain both primary and alternate destinations.

Figure 7:
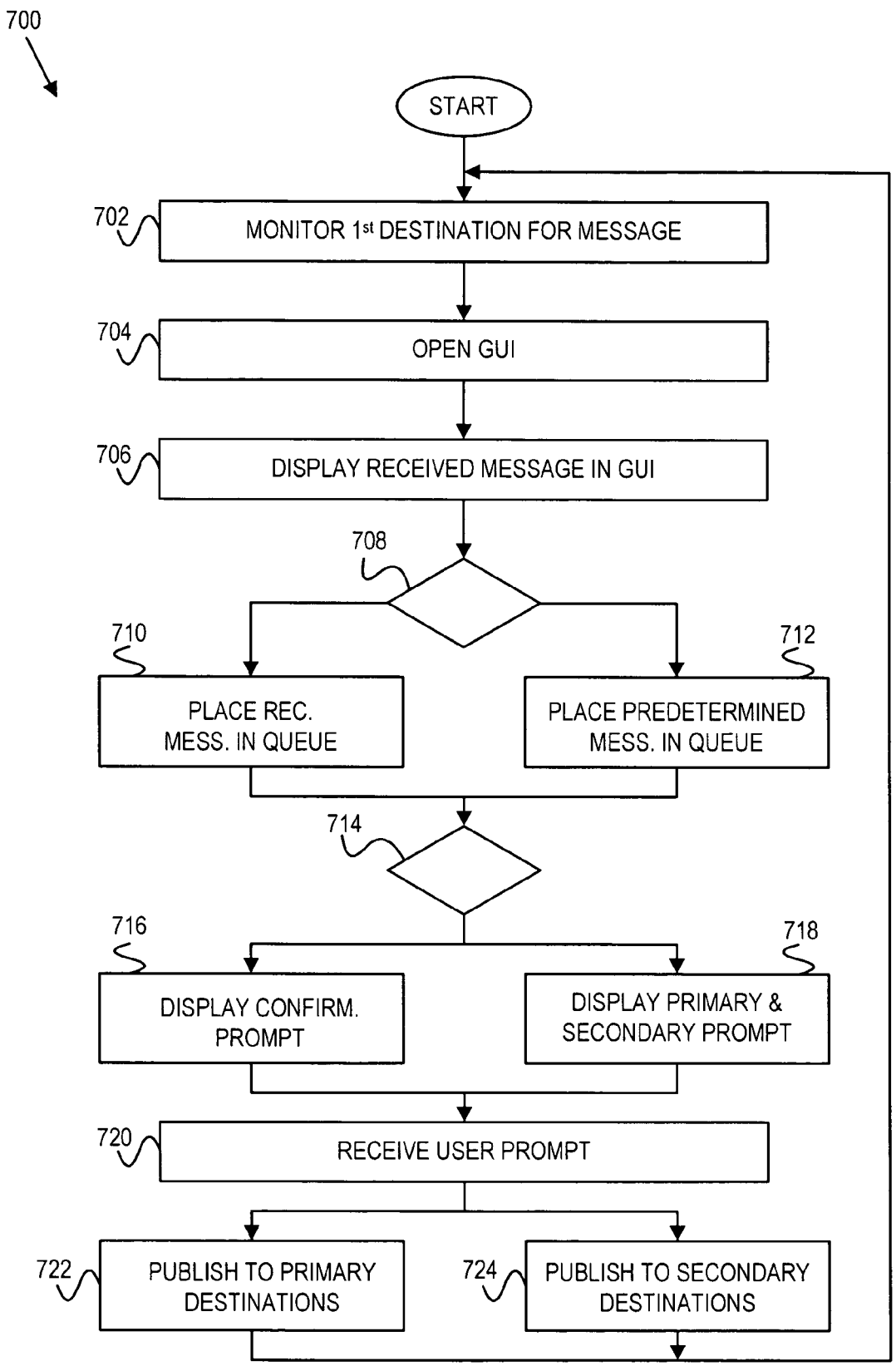
FIG. 7 is a flowchart of a method for operating a service proxy in a routing mode, according to an embodiment.

FIG. 7 is a flowchart of method 700 for operating service proxy 200 in the routing mode. Method 700 begins with step 702, wherein service proxy 200 monitors at least one first destination for receipt of a received message. In step 704, a GUI is opened, and a representation of the received message is displayed in the GUI in step 706. Service proxy 200 determines in step 708 whether it is to publish the received message to at least one second destination, or if alternately, service proxy 200 is to publish a predetermined message to the second destination. In an embodiment, service proxy 200 compares the received message to processing information housed in the configuration file in order to execute decision 708.

If the result of decision 708 is that service proxy 200 should publish the received message, service proxy 200 places the received message in a queue in step 710. The queue may be located internal or external to SOA computer infrastructure 100. If the result of decision 708 is that service proxy 200 should publish the predetermined message, service proxy 200 places the predetermined message in the queue in step 712. In an embodiment, the predetermined message may be housed in a message file, which may be identified in the configuration file. In some embodiments, a common message file houses a plurality of predetermined messages; in other embodiments, each predetermined message is housed in a respective message file.

In decision 714, service proxy 200 determines whether the configuration file includes any applicable alternate destinations in addition to the primary destination. If decision 714 determines that there are no applicable alternate destinations, service proxy 200 is to publish the message placed in the queue solely to the primary destination. Accordingly, a confirmation prompt, which informs the user that solely the primary destination is available, is displayed in the GUI step 716.

Conversely, if decision 714 determines that both primary and alternate destinations exist, a user may direct that service proxy 200 publish the message placed in the queue to either each primary destination or each alternate destination. Accordingly, primary and alternate prompts are displayed in the GUI in step 718 to allow the user to choose between the primary and alternate destination.

Steps 716 and 718 proceed to step 720, wherein service proxy 200 receives a user prompt in response to the one or more prompts displayed in step 716 or 718. If there are no applicable alternate destinations in the configuration file, the user prompt must be a confirmation prompt. In the event there are applicable alternate destinations in the configuration file, the user prompt may consist of a primary destination prompt or a secondary destination prompt.

If the user prompt consists of a confirmation prompt or a primary destination prompt, service proxy 200 publishes the message placed in the queue to the primary destination in step 722. If the user prompt consists of an alternate destination prompt, the service proxy 200 publishes the message placed in the queue to the alternate destination in step 724. Method 700 proceeds from steps 722 or 724 back to step 702; consequently, method 700 continues to operate until it is manually interrupted or until it detects a kill message on a destination that it is monitoring.

Figure 8:
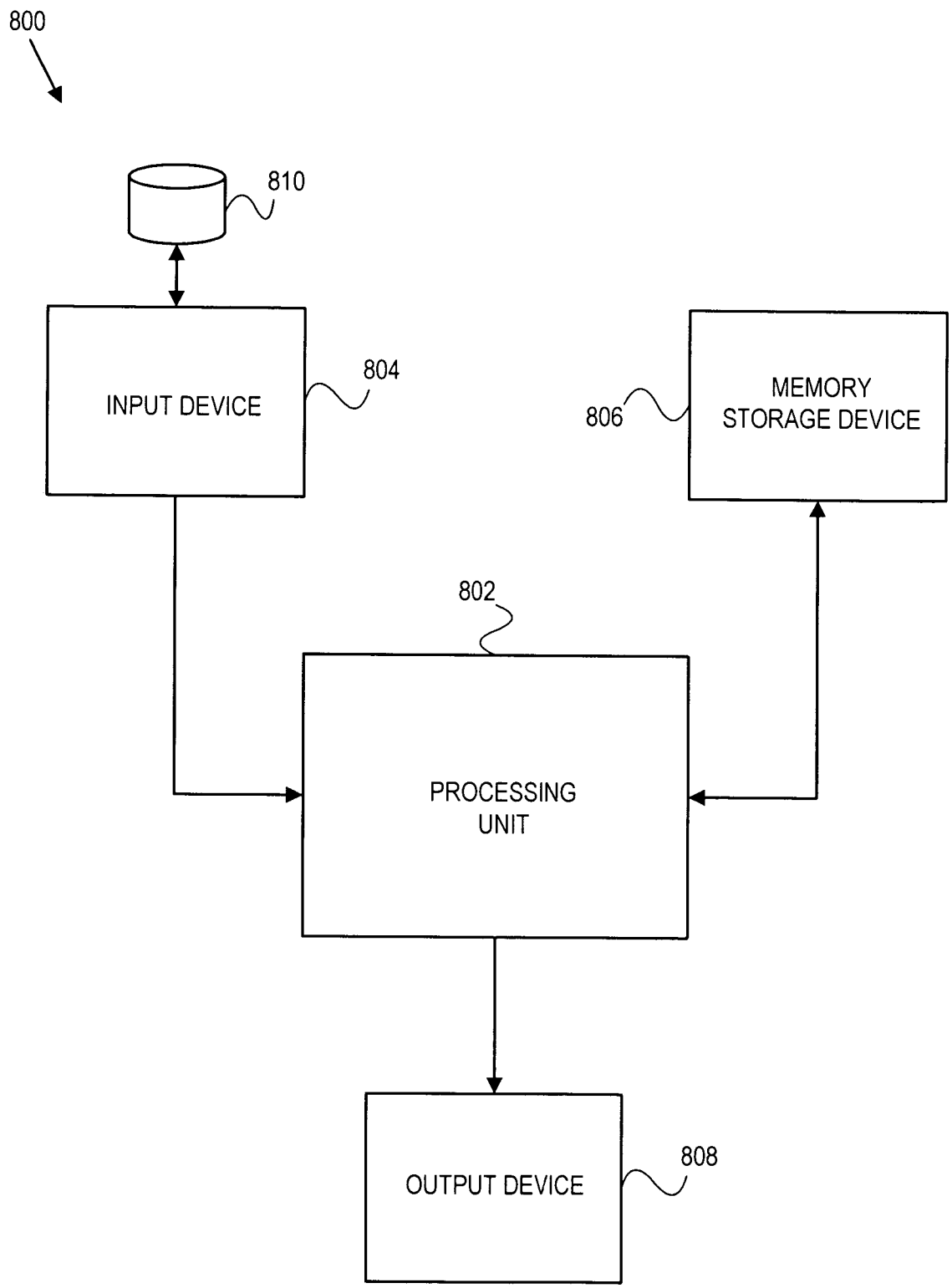
FIG. 8 schematically illustrates a computer system, according to an embodiment.

Service proxy 200 may be executed on computer system 800 of FIG. 8. Computer system 800 includes processing unit 802, input device 804, memory storage device 806, and output device 808.

Processing unit 802 executes instructions and processes data received by computer system 800. Processing unit 802 may be a general purpose or custom designed central processing unit, such as a microprocessor. Additionally, processing unit 802 may represent a plurality of central processing units.

Processing unit 802 is operable to operate service proxy 200 in the audit, injector, pub-sub, interceptor, and routing modes.

Input device 804 is coupled to processing unit 802. Input device 804 provides a means for inputting data or instructions, such as a configuration file and/or computer code embodying service proxy 200, to processing unit 802. Input device 804 may be any acceptable device that allows data to be transferred to computer system 800. For example, input device 804 may be a keyboard, a pointing device, a network interface device, a modem, a magnetic disk or tape drive, and/or an optical drive. In an embodiment, input device 804 obtains a configuration file and/or an embodiment of the service proxy from computer readable media 810.

Memory storage device 806 is coupled to processing unit 802. Memory storage device 806 provides a means for processing unit 802 to store data or instructions for later use. Memory storage device 806 may consist or any one or more apparatuses operable to store data for use by processing unit 802. For example, memory storage device 806 may consist of random access memory.

Output device 808 is coupled to processing unit 802. Output device 808 provides a means for processing unit 802 to output data. Output device 808 may be any acceptable device that allows data to be transferred out of computer system 800. For example, output device 808 may be a monitor, a printer, a network interface device, a modem, a magnetic disk or tape drive, and/or an optical drive.

Changes may be made in the above methods, systems and structures without departing from the scope hereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall therebetween.

The invention claimed is:

1. A method of emulating a service within a computer infrastructure, comprising:
    providing a service proxy instance as a stand-in for the service;
    integrating the service proxy instance into the computer infrastructure;
    running the service proxy instance on a computer accessible to the computer infrastructure to test or demonstrate the infrastructure, wherein the service being emulated is missing, defective, or incomplete;
    configuring the service proxy instance at run time in accordance with a configuration file, the configuration file including an operating mode specification; and
    communicating between the service proxy instance and at least one destination in adherence to the operating mode specification and a communication protocol, said communicating including
    monitoring at least one first destination for receipt of a received message;
    receiving the received message;
    determining whether the service proxy instance is to publish the received message or a predetermined message housed in a message file to at least one second destination by comparing the message to processing information in the configuration file;
    placing the received message in a queue if the service proxy instance is to publish the received message to the second destination;
    placing the predetermined message in the queue upon the first destination's receipt of the received message if the service proxy instance is to publish the predetermined message to the second destination; and
    publishing the message stored in the queue to the second destination.

2. The method of claim 1, wherein the configuration file further comprises an extensible markup language file.

3. The method of claim 1, wherein the communication protocol adheres to a Java Messaging Service specification.

4. The method of claim 1, further comprising communicating between at least one fully functional service and at least one destination.

5. The method of claim 1, further comprising a plurality of service proxy instances communicating with a single destination.

6. The method of claim 1, further comprising emulating a plurality of services with a respective service proxy instance for each service.

7. The method of claim 6, wherein each service proxy instance is configurable via a respective configuration file.

8. The method of claim 6, wherein each service proxy instance is configurable via a common configuration file.

9. The method of claim 1, further comprising terminating the service proxy instance upon receiving a kill message.

10. The method of claim 1, wherein the service proxy instance is operable to communicate with a plurality of destinations.

11. The method of claim 1 further comprising waiting a delay time before publishing the message stored in the queue to the second destination.

12. The method of claim 1, wherein the second destination is housed in a "reply-to" field of the message.

13. The method of claim 1, wherein the second destination is a predetermined destination housed in the configuration file.

14. The method of claim 1, wherein the said communicating further comprises;
    opening a graphical user interface window before said monitoring;
    displaying a representation of the received message in the graphical user interface window; and
    waiting until the service proxy instance receives a request to proceed before said publishing.

15. The method of claim 14, wherein the second destination is housed in a "reply-to" field of the message.

16. The method of claim 14, wherein the second destination is a predetermined destination housed in the configuration file.

17. The method of claim 1, wherein said communicating further comprises;
    opening a graphical user interface window upon the first destination's receipt of the received message;
    displaying the received message in the graphical user interface window;
    determining whether the configuration file includes at least one alternate destination;
    displaying a confirmation prompt in the graphical user interface window if the configuration file does not include at least one alternate destination;
    displaying a primary destination prompt and an alternate destination prompt in the graphical user interface window if the configuration file includes at least one alternate destination;
    receiving a user prompt;
    publishing the message stored in the queue to each primary destination if the user prompt identifies the configuration prompt or the primary destination prompt; and publishing the message stored in the queue to each alternate destination if the user prompt identifies the secondary destination prompt.

18. A computer system for emulating a service within a computer infrastructure, comprising:
  a processing unit configured to execute instructions and process data;
  a memory storage device for storing data or instructions and coupled to the processing unit;
  an input device coupled to the processing unit and operable to input data or instructions;
  an output device coupled to the processing unit for transferring data out of the computer system;
  the processing unit being further configured to:
  running a service proxy instance to test or demonstrate the infrastructure, wherein the service being emulated is missing, defective, or incomplete;
  configure the service proxy instance at run time in accordance with a configuration file, the configuration file including an operating mode specification; and
  communicate between the service proxy instance and at least one destination in adherence to the operating mode specification and a communication protocol, wherein said processing unit is further configured to:
    monitor at least one first destination for receipt of a received message;
    receive the received message;
    determine whether the service proxy instance is to publish the received message or a predetermined message housed in a message file to at least one second destination by comparing the message to processing information in the configuration file;
    place the received message in a queue if the service proxy instance is to publish the received message to the second destination;
    place the predetermined message in the queue upon the first destination's receipt of the received message if the service proxy instance is to publish the predetermined message to the second destination; and
    publish the message stored in the queue to the second destination.

19. A software product comprising instructions, stored on computer-readable media, wherein the instructions, when executed by a computer, perform the steps of claim 1.

20. A software product comprising instructions, stored on computer-readable media, wherein the instructions, when executed by a computer, perform the steps of claim 14.

21. A software product comprising instructions, stored on computer-readable media, wherein the instructions, when executed by a computer, perform the steps of claim 17.

22. The computer system of claim 18, wherein the processing unit is further configured to:
  open a graphical user interface window;
  display a representation of the received message in the graphical user interface window; and
  wait until the service proxy instance receives a request to proceed.

23. The computer system of claim 18, wherein the processing unit is further configured to:
  open a graphical user interface window upon the first destination's receipt of the received message;
  display the received message in the graphical user interface window;
  determine whether the configuration file includes at least one alternate destination;
  display a confirmation prompt in the graphical user interface window if the configuration file does not include at least one alternate destination;
  display a primary destination prompt and an alternate destination prompt in the graphical user interface window if the configuration file includes at least one alternate destination;
  receive a user prompt;
  publish the message stored in the queue to each primary destination if the user prompt identifies the configuration prompt or the primary destination prompt; and
  publish the message stored in the queue to each alternate destination if the user prompt identifies the secondary destination prompt.

* * * * *